(12) United States Patent
Huang et al.

(10) Patent No.: US 12,105,334 B2
(45) Date of Patent: Oct. 1, 2024

(54) OPTICAL FIBER SIGNAL DIRECT GUIDED OPTICAL MODULE

(71) Applicant: SHENZHEN AFALIGHT CO., LTD., Guangdong (CN)

(72) Inventors: Junbin Huang, Shenzhen (CN); Quanfei Fu, Shenzhen (CN); Xiaoqin Tong, Shenzhen (CN)

(73) Assignee: SHENZHEN AFALIGHT CO., LTD., Shenzhen (CN)

( * ) Notice: Subject to any disclaimer, the term of this patent is extended or adjusted under 35 U.S.C. 154(b) by 70 days.

(21) Appl. No.: 18/074,171

(22) Filed: Dec. 2, 2022

(65) Prior Publication Data

US 2023/0314734 A1 Oct. 5, 2023

(30) Foreign Application Priority Data

Mar. 30, 2022 (CN) .......................... 202210321176.1

(51) Int. Cl.
*H04B 10/00* (2013.01)
*G02B 6/42* (2006.01)

(52) U.S. Cl.
CPC .......... *G02B 6/4228* (2013.01); *G02B 6/424* (2013.01); *G02B 6/428* (2013.01)

(58) Field of Classification Search
CPC ...... G02B 6/4228; G02B 6/424; G02B 6/428; G02B 6/4202; G02B 6/4231; G02B 6/4214; G02B 6/4287; G02B 6/4219
See application file for complete search history.

(56) References Cited

U.S. PATENT DOCUMENTS

| | | | | |
|---|---|---|---|---|
| 5,555,340 | A * | 9/1996 | Onishi | G02B 6/03677 385/127 |
| 5,963,700 | A * | 10/1999 | Kato | G02B 6/03633 385/127 |
| 8,235,604 | B2 * | 8/2012 | Suzuki | G02B 6/4249 385/88 |
| 9,052,475 | B2 * | 6/2015 | Rosenberg | G02B 6/4292 |
| 9,354,387 | B2 * | 5/2016 | Hayashi | G02B 6/4201 |
| 9,500,820 | B2 * | 11/2016 | Huang | G02B 6/4212 |
| 9,995,892 | B2 * | 6/2018 | Xu | G02B 6/4292 |
| 10,012,808 | B2 * | 7/2018 | Chou | G02B 6/423 |
| 10,036,856 | B2 * | 7/2018 | Suematsu | G02B 6/42 |
| 10,162,120 | B2 * | 12/2018 | Zine-El-Abidine | G03F 7/20 |
| 10,379,299 | B2 * | 8/2019 | Suematsu | G02B 6/4249 |
| 10,481,350 | B1 * | 11/2019 | Grehn | G02B 6/4214 |
| 10,539,746 | B2 * | 1/2020 | Nakanishi | G02B 6/03616 |

(Continued)

*Primary Examiner* — Agustin Bello
(74) *Attorney, Agent, or Firm* — Ying-Ting Chen (57) ABSTRACT

The invention relates to an optical fiber signal direct guided optical module which comprises a connector, a control circuit board and a plastic optical fiber. The control circuit board is connected to the connector and is provided with a functional optical module. The plastic optical fiber is provided with an optical fiber end face corresponding to the functional optical module. The distance L between the end face of the optical fiber and the top face of the functional optical module is in range Of 50 μm to 150 μm. Optical signals emitted by the end face of the optical fiber can be directly received by the functional optical module, and optical signals emitted by the functional optical module can also directly penetrate through the end face of the optical fiber to be received by the plastic optical fiber.

1 Claim, 11 Drawing Sheets

(56) References Cited

U.S. PATENT DOCUMENTS

| | | | |
|---|---|---|---|
| 10,739,536 B2* | 8/2020 | Matsushita | G02B 6/36 |
| 10,807,330 B2* | 10/2020 | Matsushita | G02B 6/3636 |
| 10,921,522 B2* | 2/2021 | Hara | G02B 6/424 |
| 11,385,405 B2* | 7/2022 | Yu | G02B 6/125 |
| 11,782,222 B2* | 10/2023 | Nakanishi | G02B 6/3829 |
| | | | 385/78 |
| 11,841,529 B2* | 12/2023 | Hasegawa | G02B 6/023 |
| 2003/0034438 A1* | 2/2003 | Sherrer | G02B 6/4257 |
| | | | 250/216 |
| 2005/0220437 A1* | 10/2005 | Kim | G02B 6/43 |
| | | | 385/32 |
| 2009/0041415 A1* | 2/2009 | Tanobe | G02B 6/02042 |
| | | | 385/127 |
| 2009/0310907 A1* | 12/2009 | Ikeda | B29C 66/73112 |
| | | | 156/275.7 |
| 2010/0092128 A1* | 4/2010 | Okayama | G02B 6/4246 |
| | | | 385/33 |
| 2010/0178006 A1* | 7/2010 | Nishimura | G02B 6/4202 |
| | | | 385/55 |
| 2010/0232743 A1* | 9/2010 | Ishikawa | G02B 6/3636 |
| | | | 385/88 |
| 2010/0247042 A1* | 9/2010 | Suzuki | G02B 6/4249 |
| | | | 385/88 |
| 2011/0123149 A1* | 5/2011 | Hemenway Jr. | G02B 6/4249 |
| | | | 385/32 |
| 2012/0155811 A1* | 6/2012 | Chiang | G02B 6/423 |
| | | | 385/92 |
| 2012/0275742 A1* | 11/2012 | Nishigaki | G02B 6/4201 |
| | | | 385/14 |
| 2013/0209020 A1* | 8/2013 | Doerr | G02B 6/12004 |
| | | | 385/2 |
| 2015/0125110 A1* | 5/2015 | Anderson | G02B 6/122 |
| | | | 385/14 |
| 2015/0168646 A1* | 6/2015 | Arai | G02B 6/122 |
| | | | 385/33 |
| 2015/0268414 A1* | 9/2015 | Hayashi | H04B 10/25891 |
| | | | 385/127 |
| 2015/0277032 A1* | 10/2015 | Hayashi | G02B 6/44 |
| | | | 385/126 |
| 2015/0309261 A1* | 10/2015 | Kobyakov | G02B 6/124 |
| | | | 385/14 |
| 2015/0316713 A1* | 11/2015 | Yamamoto | H04B 10/2525 |
| | | | 385/127 |
| 2016/0047990 A1* | 2/2016 | Zine-El-Abidine | |
| | | | G02B 6/3656 |
| | | | 430/311 |
| 2016/0091677 A1* | 3/2016 | Furuya | G02B 6/4216 |
| | | | 385/14 |
| 2016/0238793 A1* | 8/2016 | Frankel | G02B 6/14 |
| 2016/0291261 A1* | 10/2016 | Izumi | G02B 6/421 |
| 2016/0359568 A1* | 12/2016 | De Dobbelaere | H04B 10/801 |
| 2017/0212307 A1* | 7/2017 | Jiang | G02B 6/3672 |
| 2017/0293084 A1* | 10/2017 | Zhou | G02B 6/32 |
| 2017/0329093 A1* | 11/2017 | Tanaka | G02B 6/122 |
| 2018/0136409 A1* | 5/2018 | Mitose | G02B 6/4478 |
| 2018/0156987 A1* | 6/2018 | Nakanishi | G02B 6/4285 |
| 2018/0292621 A1* | 10/2018 | Nanjo | G01S 7/4818 |
| 2018/0361691 A1* | 12/2018 | Matsushita | G02B 6/02395 |
| 2019/0072705 A1* | 3/2019 | Kaneuchi | G02B 6/424 |
| 2019/0129101 A1* | 5/2019 | Kaneuchi | C03B 37/15 |
| 2021/0199903 A1* | 7/2021 | Huang | H01S 5/02251 |
| 2021/0356655 A1* | 11/2021 | Bennett | G02B 6/0281 |
| 2022/0158735 A1* | 5/2022 | Zhang | G02B 6/30 |
| 2022/0276454 A1* | 9/2022 | Chen | G02B 6/4287 |
| 2023/0228936 A1* | 7/2023 | Hasegawa | G02B 6/02023 |
| | | | 385/123 |
| 2023/0314734 A1* | 10/2023 | Huang | G02B 6/428 |
| | | | 385/88 |

\* cited by examiner

OPTICAL FIBER SIGNAL DIRECT GUIDED OPTICAL MODULE

BACKGROUND OF THE PRESENT INVENTION

Field of Invention

The present invention relates to an optical module, in particular a direct guided optical module in which optical fiber signals in a plastic optical fiber are guided directly into a functional optical module.

Description of Related Arts

The optical module is referred to optical transceiver module, which is a core device in optical communication, and can complete the conversion of optical signals into electrical signals and the conversion of electrical signals into optical signals. The optical module is mainly consisted of optoelectronic devices, functional circuits and optical interfaces, wherein the optoelectronic device comprises a receiving part and an emitting part. Simply speaking, the receiving part can convert optical signals into electrical signals and the transmitting part can convert electrical signals into optical signals.

In order to guarantee the quality of signal transmission over long distances, the optical transmission part of optical module is mainly made of quartz optical fiber (GOF) at present. Because GOF has disadvantage of being less prone to bending, an optical path switching components must be provided in the optical module.

Figure 1:
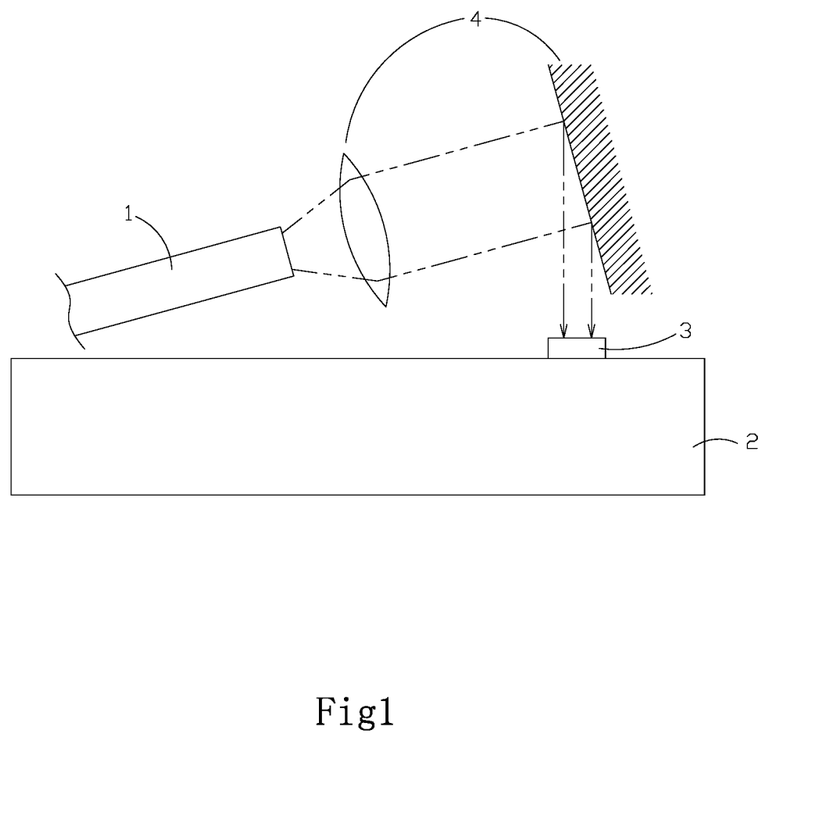
FIG. 1 is a principal drawing of the optical module in prior art.

As shown in FIG. 1, a glass optical fiber (GOF) 1 is arranged obliquely, and a functional module 3 is provided on the circuit board 2 arranged horizontally. The functional module 3 may be a light emitting module or a light receiving module. In order to project the light beam in the glass optical fiber 1 onto the functional module 3, a light converter 4 must be provided between the glass optical fiber 1 and the functional module 3, and the light converter 4 typically comprises a plurality of light lenses and light mirrors. In addition, when the glass optical fiber 1 is being assembled, the structures in contact with the glass optical fiber 1 need to be ground and polished in order to ensure the flatness of the glass optical fiber 1.

The optical module mentioned above mainly has the following disadvantages. First, the optical module needs light converters 4 to change the light direction, thus results in not only complex structure and inefficient processing, but also increased light energy loss of the transmission process. Second, the assembling precision between various components is higher, so the technical difficulty and cost are higher. Third, due to the light path design of the optical lens and mirror, the coupling process is difficult, thus results in lower coupling accuracy and inefficiency.

The disadvantage said above is a major drawback of producing optical modules by quartz glass optical fibers.

There are also cases making optical modules by plastic optical fiber (POF). POF can transmit light because it has core-sheath structure, and light is transmitted through POF by total reflection. POF is characterized by great fiber core, lighter weight, simple fabrication, convenient attachment, good flexibility, easy deployment, and durable material. POF can be classified into step index (SI) plastic optical fiber and graded index (GI) plastic optical fiber, which are abbreviated as SI-POF and GI-POF.

Because the features of GI-POF are similar to GOF, there is a trend to replace GOF with GI-POF in many fields.

Figure 2:
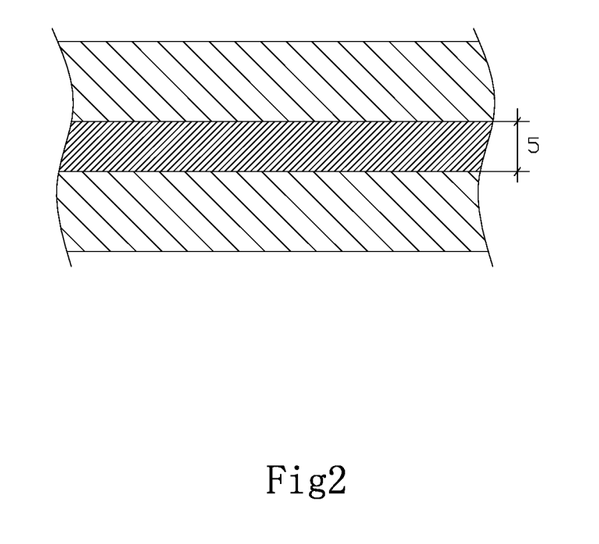
FIG. 2 is a drawing of the core aperture of plastic optical fiber in prior art.

As shown in FIG. 2, GI-POF has a small core aperture 5 and common aperture can be as small as 100 microns or so. Similar to GOF, the transmission rate of GI-POF multiplied by distance is larger, and the effect of transmission is better, but GI-POF is rather expensive due to the difficult process of the small core aperture 5, therefore the cost of optical module produced by GI-POF is very high.

SUMMARY OF THE PRESENT INVENTION

The technical solution of the present invention is that an optical fiber signal direct guided optical module comprises a connector, a control circuit board and a plastic optical fiber.

The control circuit board is connected to the connector and is provided with a functional optical module. The plastic optical fiber is provided with an optical fiber end face corresponding to the functional optical module.

The distance L between the end face of the optical fiber and the top face of the functional optical module is in range Of 50 μm to 150 μm.

Optical signals emitted by the end face of the optical fiber can be directly received by the functional optical module, and optical signals emitted by the functional optical module can also directly penetrate through the end face of the optical fiber to be received by the plastic optical fiber.

The plastic optical fiber comprises an optical fiber core and a wrapping layer wrapping the optical fiber core, and an optical transmission reflecting surface is formed between the optical fiber core and the wrapping layer.

The ratio D1/D2 between the aperture D1 of the optical fiber core and the aperture D2 of the wrapping layer is more than or equal to 0.6 and less than 1.

The beneficial effects of the present invention are as follows. First, the functional optical modules provided on a general control circuit board are all placed horizontally, and the glass optical fiber (GOF) may be bent and break, so in order to transmit optical signal, light converters are required, thus the cost must be increased and at same time the size is greatly increased. The greatest advantage of optical transmission using a glass optical fiber (GOF) is the weaker attenuation of optical signals transmitted over long distances, however, most signal transmissions are done within 1 meter in practical applications, such as connecting a display screen to a host computer, connecting a television to a set-top box, and so on, and in the above-described use scenarios, there is an overabundance of transmission if glass fiber optic modules are used. The inventors targeted the present application according to the transmission characteristics of glass optical fibers and plastic optical fibers. In the present invention, the aperture of the fiber core is larger, so the cost is lower, and the drawback is also significant, that is not accommodating transmission of optical signals over long distances, but the total length of the plastic optical fiber is controlled to within 3 meters in this application, so the present application can properly transmit the optical signal over a limited distance, thus drastically reduces the cost and greatly expands the field of applicability. In practice, cost of the products produced according to the present application can be reduced seven to ten times. Second, when the ratio between the aperture of the fiber core and the aperture of the wrapping layer is less than 0.6, the characteristics of plastic optical fibers are close to glass optical fibers, but such plastic optical fibers are complicated to be processed and costly to be produced, although having characteristics of bending, such optical fibers lose value in replacing glass optical fibers as the costs are increased drastically even beyond glass optical fibers. The present invention target the present application by controlling the ratio to a reasonable range and taking into account the total length of the plastic optical fiber. Third, in the present invention, the fiber end face is directly corresponded to the functional optical module, thereby the light converter is eliminated, furthermore, the cost and the volume are simultaneously reduced.

DETAILED DESCRIPTION OF THE PREFERRED EMBODIMENT

Figure 3:
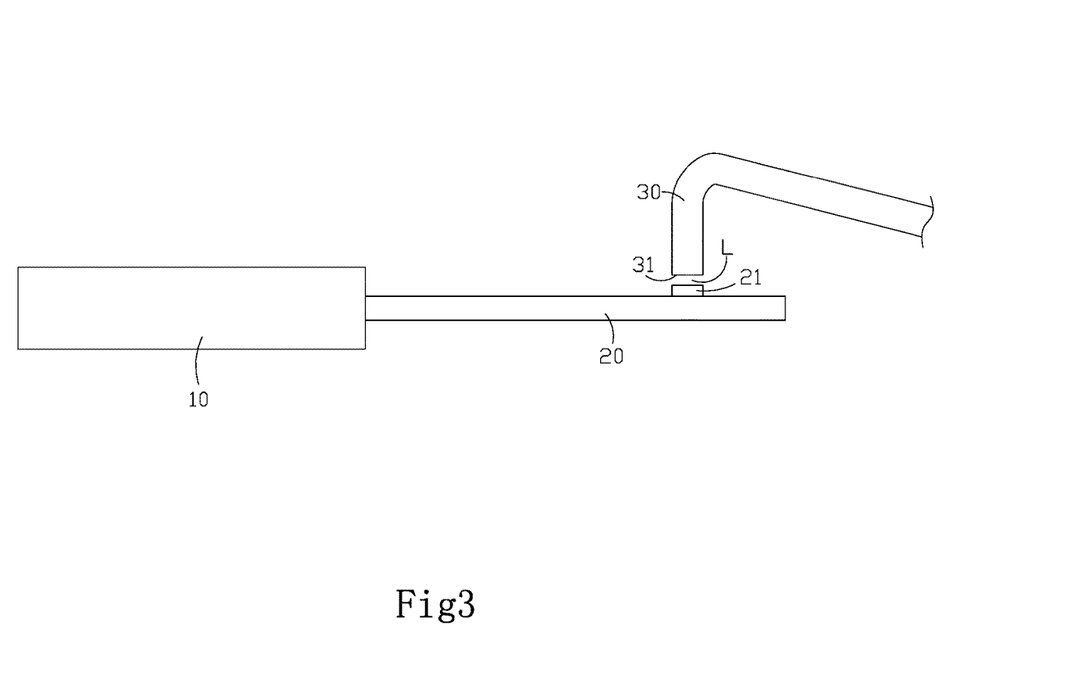
FIG. 3 is a drawing of the principle of the present invention.

As shown in FIG. 3 to FIG. 1H, an optic fiber signal direct-guided optical module comprises a connector 10, a control circuit board 20 and a plastic optical fiber 30 As shown in FIG. 3, the control circuit board 20 is connected to the connector 10 and is provided with a functional optical module 21, and the plastic optical fiber 30 has an optical fiber end face 31 corresponding to the functional optical module 21.

The distance L between the optical fiber end face 31 and the top face of the functional optical module 21 is controlled to be 50 μm to 150 μm to ensure the optical signals can be received.

Optical signals emitted from the optical fiber end face 31 can be received directly by the functional optical module 21, and optical signals emitted from the functional optical module 21 can also directly penetrate through the end face 31 of the optical fiber to be received by the plastic optical fiber 30.

That is to say, in practice, when the functional optical module 21 is a receiving optical module, optical signals emitted from the plastic optical fiber 30 by the fiber end face 31 can be received directly by the receiving optical module, and when the functional optical module 21 is a transmitting optical module, optical signals emitted from the transmitting optical module can penetrate directly through the optical fiber end face 31 to be received by the plastic optical fiber 30.

Figure 4:
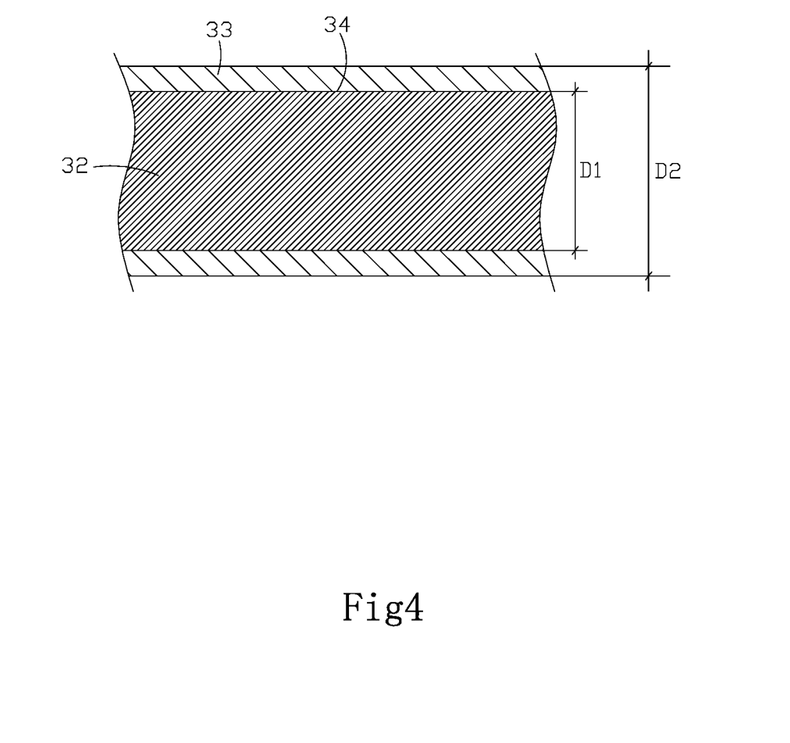
FIG. 4 is a drawing of the plastic optical fiber of the present invention.

As shown in FIG. 4, the plastic optical fiber 30 comprises an optical fiber core 32 and a wrapping layer 33 wrapping the optical fiber core 32, and an optical transmission reflecting surface 34 is formed between the optical fiber core 32 and the wrapping layer 33, during transmission of the optical signal, the optical signal is mainly transmitted in the optical fiber core 32 by reflection of the optical transmission reflecting surface 34.

The ratio between aperture D1 of fiber core 32 and aperture D2 of wrapping layer: D1/D2 is greater than or equal to 0.6 and less than 1.

In the specific implementation, the ratio between aperture D1 of fiber core 32 and aperture D2 of wrapping layer 33 may also be set as follow, D1/D2 is greater than or equal to 0.8 and less than 1.

In practice, the aperture D2 of wrapping layer 33 is typically about 500 μm, while the aperture D1 of the core 32 is typically about 485 μm.

The total length of the plastic optical fiber 30 is less than (2 mm/L)*(D2/D1)*10–D2/250 μm m.

As for the formula for the total length of the plastic optical fiber 30 of the present invention, the following example data is illustrated when be implemented.

Example 1: L=150 μm, D1/D2=0.8 (D2/D1=1/0.8), D2=750 μm, the total length of plastic optical fiber 30 is less than 0.016 meters, (2 mm/150 m)*(1/0.8)*10–750 μm/250 μm m=0.016 m.

Example 2: L=50 μm, D1/D2=0.9 (D2/D1=1/0.9), D2=500 μm, the total length of plastic optical fiber 30 is less than 0.44 m, (2 mm/50 m)*(1/0.9)*10-500 μm/250 μm m=0.44 m.

Example 3: (Most typical applied parameters) L=100 m, D1/D2=0.95 (D2/D1=1/0.95), D2=250 μm, the total length of plastic optical fiber 30 is less than 2.11 m, (2 mm/100 μm)*(1/0.95)*10–250 μm/250 μmm=2.11 m.

The core design idea of the present invention is as follows.

As shown in FIGS. 1 and 3, first, the functional light modules 21 provided on the control circuit board 20 are all horizontally positioned, and the glass optical fiber (GOF) 1 may be bent and break, so in order to transmit optical signal, light converters 4 are required, thus the cost must be increased and at same time the size is greatly increased.

The biggest advantage of optical transmission using a glass optical fiber (GOF) 1 is the weaker attenuation of optical signals transmitted over long distances, however, most signal transmissions are done within 1 meter in practical applications, such as connecting a display screen to a host computer, connecting a television to a set-top box, and so on, and in the above-described use scenarios, there is an overabundance of transmission if glass fiber optic modules are used.

The inventors targeted the present application according to the transmission characteristics of glass optical fibers and plastic optical fibers. In the present invention, the aperture D1 of the fiber core 32 is larger, so the cost is lower, and the drawback is also significant, that is not accommodating transmission of optical signals over long distances, but the total length of the plastic optical fiber 30 is controlled to within 3 meters in this application, so the present application can properly transmit the optical signal over a limited distance, thus drastically reduces the cost and greatly expands the field of applicability. In practice, cost of the products produced according to the present application can be reduced seven to ten times.

Secondly, as shown in FIG. 4, when the ratio between the aperture D1 of the fiber core 32 and the aperture D2 of the wrapping 33 D1/D2 is less than 0.6, the characteristics of plastic optical fibers are close to glass optical fibers, but such plastic optical fibers are complicated to be processed and costly to be produced, although having characteristics of bending, such optical fibers lose value in replacing glass optical fibers as the costs are increased drastically even beyond glass optical fibers.

The present invention will target the present application by controlling the ratio between D1 and D2 to a reasonable range and taking into account the total length of the plastic optical fiber 30.

Thirdly, in the present invention, the fiber end face 31 is directly corresponded to the functional optical module 21, thereby the light converter 4 is eliminated, furthermore, the cost and the volume are simultaneously reduced.

Figure 5:
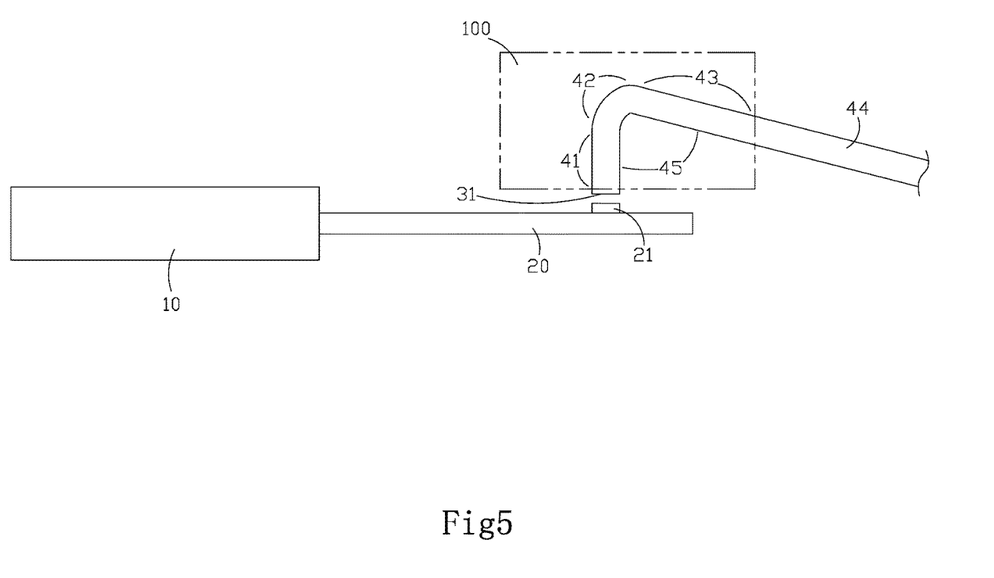
FIG. 5 is a drawing of the optical signal straight guide section, the bend section, the inclined fixed section and the epitaxial section according to the present invention.

As shown in FIG. 5, the plastic optical fiber 30 comprises an optical signal straight guide section 41, a bend section 42, an inclined fixed section 43 and an epitaxial section 44, the four sections said above are connected together to form a plastic optical fiber 30.

Wherein the optical signal straight guide section 41 is in correspondence with the functional optical module 21, and the optical fiber end face 31 is positioned at the front end of the optical signal straight guide section 41, the bend section 42 is connected between the optical signal straight guide section 41 and the inclined fixed section 43, a transition angle 45 is determined by the bend section 42 between the optical signal straight guide section 41 and the inclined fixed section 43, so that the optical signal straight guide section 41 can be in correspondence with the functional optical module 21, and the degree of bending of the bend section 42 determines the value of the transition angle 45.

In the specific implementation, the transition angle 45 is controlled to be 1800 to 90°, preferably 80° to 70°.

It is emphasized that the present invention targets the design of the bend section 42 by virtue of the bendable nature of the plastic optical fiber 30. The bend section 42 can make the optical signal straight guide section 41 directly in correspondence with the functional optical module 21, thereby omits the light converter 4 of the prior art.

The conventional glass fibers may be broken under bending, so the optical modules produced by glass fibers do not have bend section 42.

In the specific implementation, the functional optical module 21 is arranged horizontally and optical signal straight guide section 41 is directly above the functional optical module 21.

The inclined fixed section 43 is fixed in the optical fiber connector 100 to position the optical signal straight guide section 41 and the bend section 42.

The epitaxial section 44 is externally wrapped with optical fiber and is disposed outside of the optical module, and the total length of the epitaxial section 44 is smaller than (2 mm/L)*(D2/D1)*10−D2/250 μmm.

Figure 6:
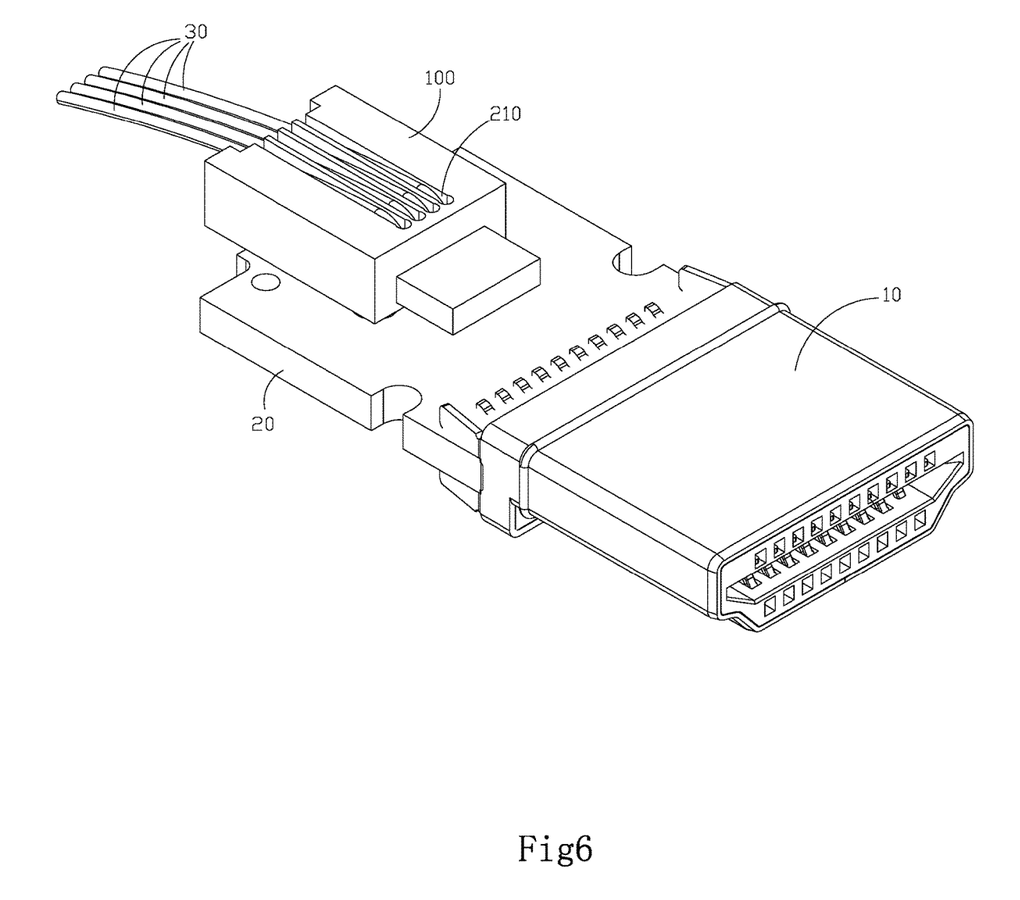
FIG. 6 is a perspective view of the present invention.
Figure 7:
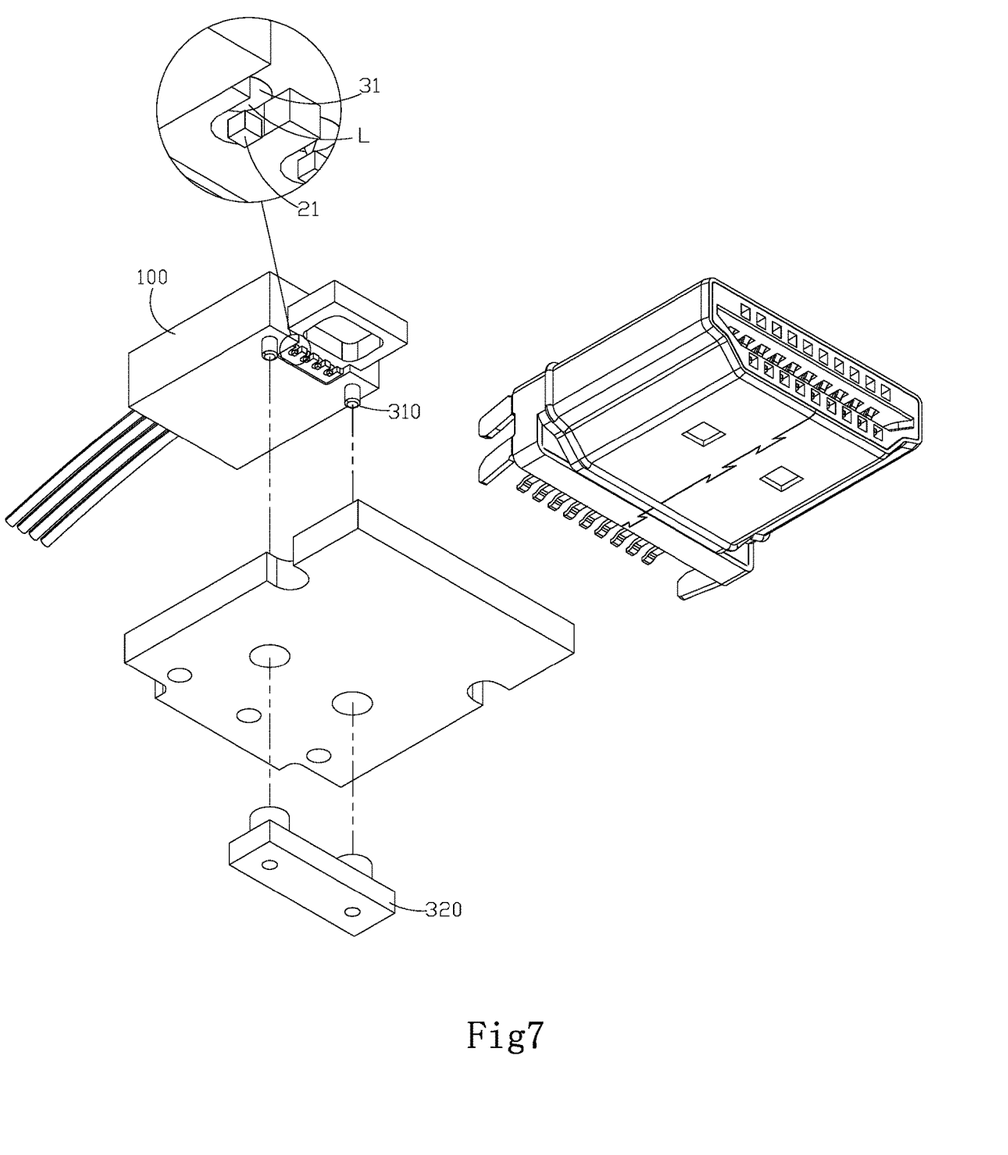
FIG. 7 is an exploded drawing of the present invention.

As shown in FIGS. 5 to 7, the optical module further comprises an optical fiber connector 100 connected between the plastic optical fiber 30 and the control circuit board 20.

The optical fiber connector 100 is used to fix the plastic optical fiber 30 on the control circuit board 20, while the optical fiber end face 31 of the plastic optical fiber 30 is in correspondence with the functional optical module 21 provided on the control circuit board 20 to transmit the optical signals between the plastic optical fiber 30 and the functional optical module 21.

The docking and position fixing between the optical fiber 1 and the functional module 3 in the prior art is realized by an encapsulating glue and an encapsulating process. In general, first, fixing the functional module 3 on the circuit board 2, after that, fixing the optical fiber 1 and the light converter 4 on the circuit board 2, and finally, packaging and fixing the elements said above by the encapsulating glue. The elements need to be fixed are more, and the manufacturing process is cumbersome, so the cost is high, the positions need to be aligned are more, and the alignment is less effective.

Figure 8:
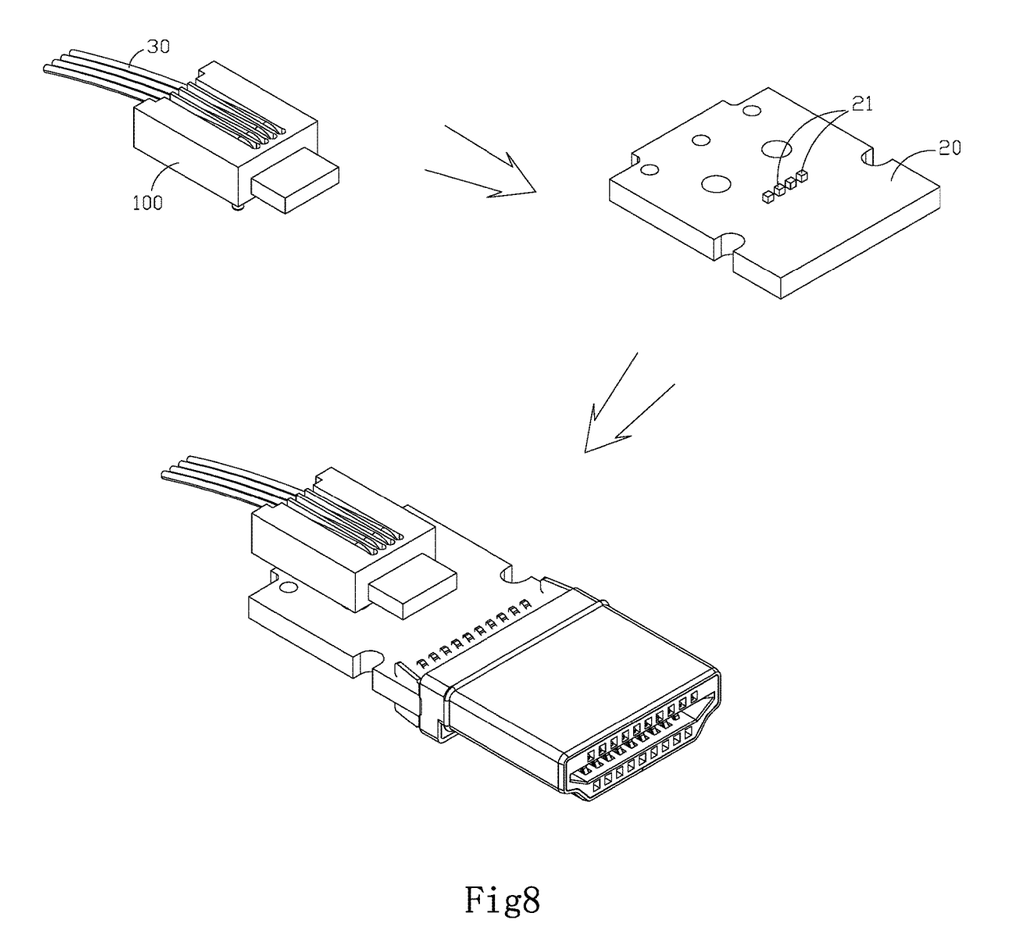
FIG. 8 is a drawing of the assembling by optical fiber connector according to the present invention.

As shown in FIG. 8, the inventive proposal of the present invention utilizes the optical fiber connector 100 as a transition element to butt, in practice, the main assembly steps are as follows.

In the first step, the plastic optical fiber 30 is arranged in the optical fiber connector 100.

In the second step, the functional optical module 21 is fixed on the control circuit board 20.

In the third step, the optical fiber connector 100 is directly arranged on the control circuit board 20, thus finishes the butt between the plastic optical fiber 30 and the functional optical module 21.

The overall assembly process is simple and the operability is great, while the docking quality is easily guaranteed.

The core ideas of the optical fiber connector 100 of the present invention are as follows.

First, the optical fiber connector 100 is introduced as a transitional component between the plastic optical fiber 30 and the functional optical module 21 to simplify the alignment.

That is to say, the plastic optical fiber 30 is arranged in the optical fiber connector 100, at the same time, the functional optical module 21 is fixed on the control circuit board 20 to complete the preliminary positioning of components.

After that, the optical fiber connector 100 is directly assembled on the control circuit board 20 either manually or automatically, thus completes the butt between the plastic optical fiber 30 and the functional optical module 21.

The overall assembly process is simple and the operability is great, while the docking quality is easily guaranteed.

Second, the optical fiber connector 100 is introduced to omit the encapsulating glue and encapsulating process, and to simplify the assembly process, and to reduce the cost greatly.

Third, fixing and aligning are simplified to one action (assembling the optical fiber connector 100 directly on the control circuit board 20) results in improved product quality and improved mating accuracy.

The optical fiber connector 100 comprises an optical fiber fixed portion in which the plastic optical fiber 30 is disposed and an assembly alignment portion, and the optical fiber fixed portion is configured to fix and position the plastic optical fiber 30.

The assembly alignment portion is used to fix and position the optical fiber connector 100 on the control circuit board 20 such that the fiber end face 31 of the plastic optical fiber 30 can be in correspondence with the functional optical modules 21 provided on the control circuit board 20.

In specific implementation, there are various embodiments of optical fiber fixed portion and assembly alignment portion, which are now described separately as follows.

Figure 9:
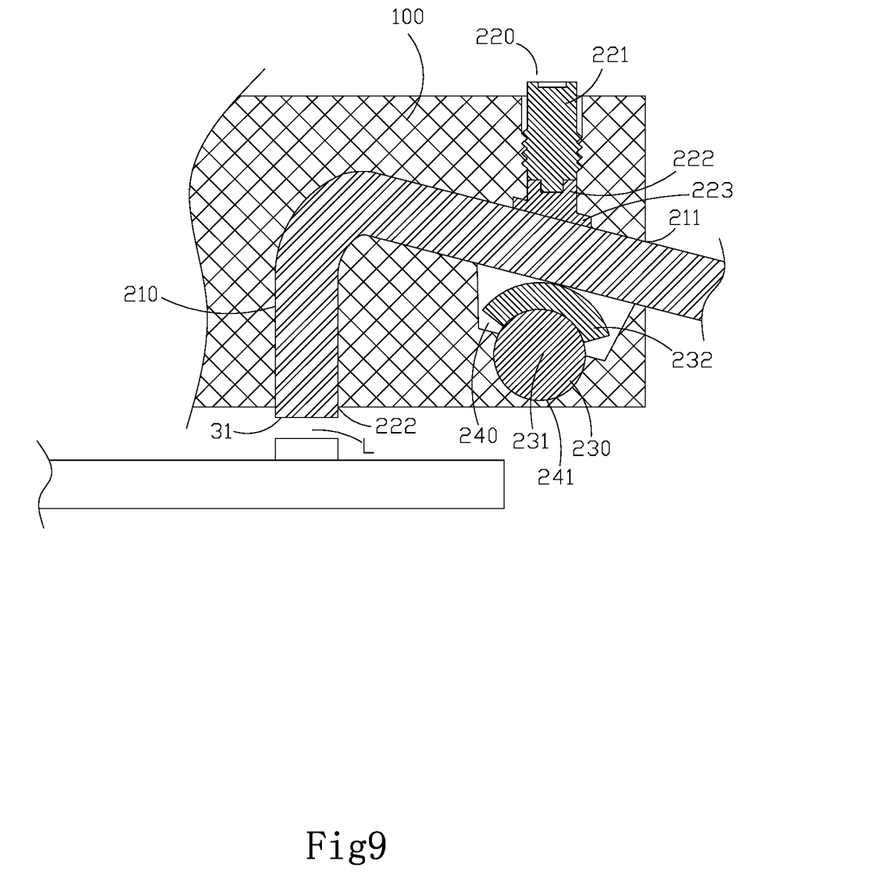
FIG. 9 is a cross-sectional view of an optical fiber connector of the present invention.

As shown in FIG. 6 and FIG. 9, the first preferred embodiment of the optical fiber fixed portion is as follows.

The optical fiber fixed portion is a trunk 210 provided in the optical fiber connector 100, and the trunk 210 has an optical fiber inlet 211 and an optical fiber outlet 222, the plastic optical fiber 30 is fixed in the trunk 200, and the optical fiber end face 31 of the plastic optical fiber 30 is located at the optical fiber outlet 222.

In implementation, the trunk 210 comprises straight guiding groove, bending groove and inclined groove, in which optical signal straight guided section 41, bend section 42 and inclined fixed section 43 are respectively arranged.

Figure 10:
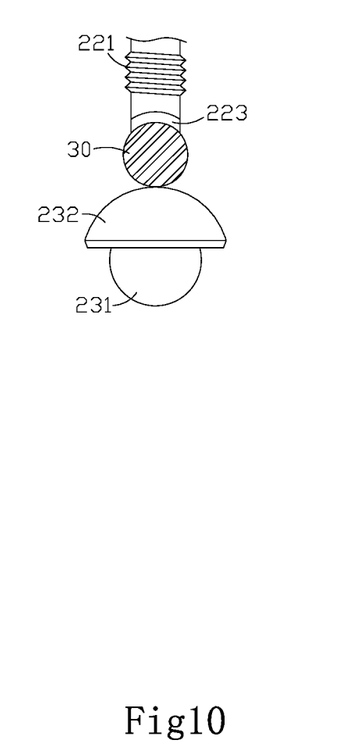
FIG. 10 is a drawing of the presser and ejector of the present invention.

As shown in FIG. 9 and FIG. 10, the second preferred embodiment of the optical fiber fixed portion is as follows.

The optical fiber fixed portion further comprises an adjuster acting on the plastic optical fiber 30 to adjust the distance L between the end face 31 of the optical fiber and the top face of the functional optical module 21.

The adjuster comprises a presser 220 and an ejector 230, wherein the presser 220 comprises a stud 221 screwed in the optical fiber connector 100 and a press block 222 pivoted below the stud 221, an arc plate 223 is provided below the press block 222 and is pressed against the plastic optical fiber 30.

The optical fiber connector 100 is provided with an adjusting cavity 240 disposed directly below the presser 220, the ejector 230 is arranged in the adjusting cavity 240 and comprises a pivoting ball 231 and a top cap 232, the pivoting ball 231 is pivoted in a ball cavity 241 arranged at the bottom of the adjusting cavity 240, the top cap 232 is made of an elastic material and fixedly covers the pivoting ball 231 and can rotate synchronously with the pivoting ball 231.

With the adjuster, the distance L can be fine-tuned, in specific implementation, the user can turn the stud 221 by means of a tool, thereby causing the press block 222 to depress the plastic optical fibers 30, so the fibers 30 bend down and deform, and the length of deform is received in the adjusting cavity 240, thus the distance L can be fine-tuned.

The ejector 230 can keep the physical form of plastic optical fiber 30 and the pivoting ball 231 can rotate, so that the force can be released when the two elements are squeezed directly, and at the same time the position can be adjusted.

As shown in FIG. 7, the first preferred embodiment of the assembly alignment portion is as follow.

The assembly alignment portion comprises a connector positioning unit 310 provided on the optical fiber connector 100 and a circuit board positioning unit 320 provided on the control circuit board 20. The connector positioning unit 310 is in correspondence with the circuit board positioning unit 320.

When the connector positioning unit 310 establishes a fixed positioning relationship with the circuit board positioning unit 320, the plastic optical fiber 30 is fixed on the control circuit board 20 by the optical fiber connector 100, at this moment, the end face 31 of the plastic optical fiber 30 is butted with the functional optical module 21 provided on the control circuit board 20.

When there is no fixed positioning relationship between the connector positioning unit 310 and the circuit board positioning unit 320, the optical fiber connector 100, the plastic optical fiber 30, are separated from the control circuit board 20.

As shown in FIG. 7, the first preferred embodiment of the assembly alignment portion is as follow.

The connector positioning unit 310 comprises a plurality of positioning pins fixedly attached to the optical fiber connector 100.

In specific implementation, a plurality of positioning pins are fixedly attached to the bottom surface of the optical fiber connector 100.

The circuit board positioning unit 320 is a positioning plate provided with number of pin holes corresponding to the positioning pins one by one, and when being assembled, the positioning pins are simultaneously plugged into the pin holes to accomplish direct assembly of optical fiber connector 100 on the control circuit board 20. In practice, the number of positioning pins may be two or three, at the same time, the number of pin holes may be two or three.

Figure 11:
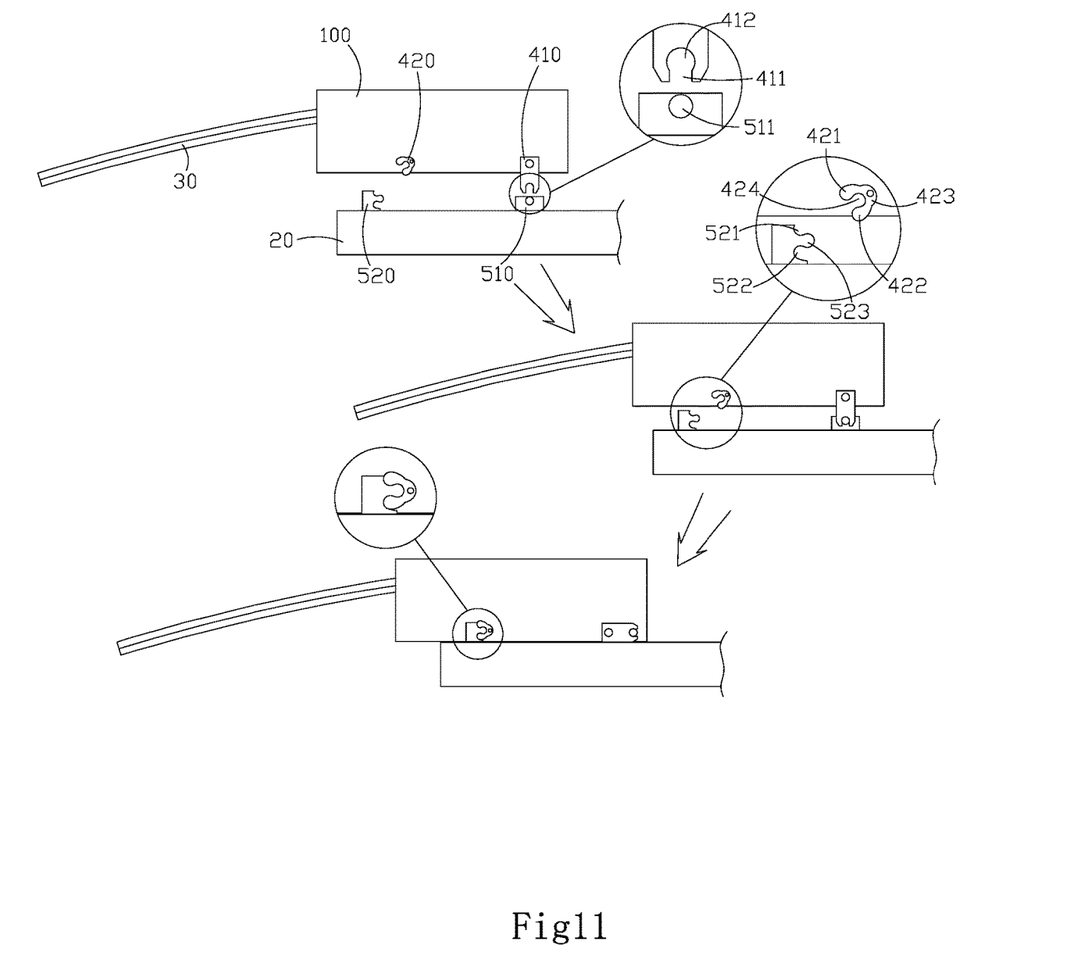
FIG. 11 is a drawing of the operating of the assembly alignment portion according to the second embodiment of the present invention.

As shown in FIG. 11, the second preferred embodiment of the assembly alignment portion is as follow.

The connector positioning unit 310 includes a turning plate 410 pivoted at the front end of the optical fiber connector 100 and a snap connector 420 pivoted at the rear end of the optical fiber connector 100.

The turning plate 410 includes an introduction groove 411 and a pivoting groove 412. The introduction groove 411 is communicated with the pivoting groove 412.

The snap connector 420 comprises a first ball head 421, a second ball head 422 and an arc turning plate 423.

The first ball head 421 and the second ball head 422 are connected at the upper and lower ends of the arc turning plate 423, respectively, a ball head cavity 424 is formed between the first ball head 421 and the second ball head 422.

The circuit board positioning unit 320 comprises a pivoting stage 510, which is provided on the control circuit board 20 in correspondence with the turning plate 410, and a fixed stage 520 provided on the control circuit board 20 in correspondence with the snap connector 420.

The pivoting stage 510 is provided with a shaft 511. The fixed stage 520 is provided with a first ball head cavity 521, a second ball head cavity 522, and a snap connector ball head 523 provided between the first ball head cavity 521 and the second ball head cavity 522.

The first ball head cavity 521 is in correspondence with the first ball head 421, while the second ball head cavity 522 is in correspondence with the second ball head 422, and the snap connector ball head 523 is in correspondence with the ball head cavity 424.

During assembling, first step, placing the optical fiber connector 100 over the control circuit board 20, and inserting the turning plate 410 down into the pivoting stage 510. The shaft 511 is eventually snapped in the pivoting groove 412 by the introduction groove 411.

In the second step, pushing back the optical fiber connector 100, and flipping down the connector 100 about the shaft 511.

In the third step, snapping the snap connector 420 in the fixed stage 520 to fix the optical fiber connector 100 on the control circuit board 20 so that the fiber end faces 31 of plastic optical fiber 30 are in correspondence with the functional optical modules 21 provided on the control circuit board 20.

During snapping of the snap connector 420 in the fixed stage 520, first, the first ball head 421 enters into the first ball head cavity 521, then, the arc turning plate 423 rotates as a whole so that the second ball head 422 gradually enters into the second ball head cavity 522. In this process, the snap connector ball head 523 also gradually enters into the ball head cavity 424. Finally, when the second ball head 422 is snapped into the second ball head cavity 522 and the snap connector ball head 523 is snapped in the ball head cavity 424, the snap connector head 420 finishes being snapped in the fixed stage 520.

The present invention has the following effects with the structure said above. First, by inserting the turning plate 410 down into the pivoting stage 510 and pushing the optical fiber connector 100 horizontally, the hard collisions of the optical fiber connector 100 and the control circuit board 20 can be avoided, thereby protecting the circuit board. Second, the fixed stage 520 and the snap connector 420 are designed to smooth the assembly action, and can greatly reduce the impact forces generated during the direct assembly to protect the structure. As described above, during snapping of the snap connector 420 in the fixed stage 520, the respective structural engagements are smooth and reliable, and minimize assembly impact forces to protect the structure.

What is claimed is:

1. An optical fiber signal direct guided optical module comprising a connector, a control circuit board and a plastic optical fiber, wherein the control circuit board is connected to the connector and is provided with a functional optical module, and the plastic optical fiber has an optical fiber end surface corresponding to the functional optical module, the distance L between the optical fiber end surface and the top surface of the functional optical module is controlled to be 50 μm to 150 μm, optical signals emitted from the optical fiber end surface can be received directly by the functional optical module, and optical signals emitted from the functional optical module can also directly penetrate through the end surface of the optical fiber to be received by the plastic optical fiber, the plastic optical fiber comprises an optical fiber core and a wrapping layer wrapping the optical fiber core, and an optical transmission reflecting surface is formed between the optical fiber core and the wrapping layer, the ratio between aperture D1 of fiber core and aperture D2 of wrapping layer: D1/D2 is greater than or equal to 0.6 and less than 1, wherein the optical module further comprises an optical fiber connector connected between the plastic optical fiber and the control circuit board, the optical fiber connector is used to fix plastic optical fiber on the control circuit board, while the optical fiber end surface of the plastic optical fiber corresponds to functional optical module provided on the control circuit board, wherein the optical fiber connector comprises an optical fiber fixed portion in which the plastic optical fiber is disposed and an assembly alignment portion, and the optical fiber fixed portion is configured to fix and position the plastic optical fiber, the assembly alignment portion is used to fix and position the optical fiber connector on the control circuit board such that the fiber end surface of the plastic optical fiber can correspond to the functional optical modules provided on the control circuit board, wherein the optical fiber fixed portion is a trunk provided in the optical fiber connector, and the trunk has an optical fiber inlet and an optical fiber outlet, the plastic optical fiber is fixed in the trunk, and the optical fiber end surface of the plastic optical fiber is located at the optical fiber outlet, wherein the optical fiber fixed portion further comprises an adjuster acting on the plastic optical fiber to adjust the distance L between the end surface of the optical fiber and the top surface of the functional optical module, the adjuster comprises a presser and an ejector, wherein the presser comprises a stud screwed in the optical fiber connector and a press block pivoted below the stud, an arc plate is provided below the press block and is pressed against the plastic optical fiber, the optical fiber connector is provided with an adjusting cavity disposed directly below the presser, the ejector is arranged in the adjusting cavity and comprises a pivoting ball and a top cap, the pivoting ball is pivoted in a ball cavity arranged at the bottom of the adjusting cavity, the top cap is made of an elastic material and fixedly covers the pivoting ball and can rotate synchronously with the pivoting ball.

* * * * *